United States Patent
Kanagawa et al.

(10) Patent No.: US 9,464,155 B2
(45) Date of Patent: Oct. 11, 2016

(54) MOISTURE-CURABLE POLYURETHANE HOT-MELT RESIN COMPOSITION, ADHESIVE, AND ARTICLE

(71) Applicant: DIC Corporation, Tokyo (JP)

(72) Inventors: Yoshinori Kanagawa, Osaka (JP); Toyokuni Fujiwara, Osaka (JP); Ryou Nonaka, Osaka (JP)

(73) Assignee: DIC CORPORATION, Tokyo (JP)

( * ) Notice: Subject to any disclaimer, the term of this patent is extended or adjusted under 35 U.S.C. 154(b) by 54 days.

(21) Appl. No.: 14/391,271

(22) PCT Filed: Mar. 14, 2013

(86) PCT No.: PCT/JP2013/057235
§ 371 (c)(1),
(2) Date: Oct. 8, 2014

(87) PCT Pub. No.: WO2013/153907
PCT Pub. Date: Oct. 17, 2013

(65) Prior Publication Data
US 2015/0099125 A1    Apr. 9, 2015

(30) Foreign Application Priority Data

Apr. 12, 2012  (JP) ................................. 2012-090963
Apr. 26, 2012  (JP) ................................. 2012-101082

(51) Int. Cl.

| | | |
|---|---|---|
| C08G 18/20 | (2006.01) | |
| C08G 18/42 | (2006.01) | |
| C08G 18/48 | (2006.01) | |
| C08G 18/62 | (2006.01) | |
| C08G 18/76 | (2006.01) | |
| C09J 175/08 | (2006.01) | |
| C08G 18/12 | (2006.01) | |
| C09J 175/04 | (2006.01) | |
| C08G 18/40 | (2006.01) | |

(52) U.S. Cl.
CPC ........... *C08G 18/2081* (2013.01); *C08G 18/12* (2013.01); *C08G 18/4009* (2013.01); *C08G 18/4063* (2013.01); *C08G 18/4202* (2013.01); *C08G 18/4216* (2013.01); *C08G 18/4238* (2013.01); *C08G 18/48* (2013.01); *C08G 18/4808* (2013.01); *C08G 18/4854* (2013.01); *C08G 18/6254* (2013.01); *C08G 18/7657* (2013.01); *C08G 18/7671* (2013.01); *C09J 175/04* (2013.01); *C09J 175/08* (2013.01); *C09J 2201/61* (2013.01); *Y10T 428/31504* (2015.04)

(58) Field of Classification Search
CPC .... C08G 18/12; C08G 18/48; C08G 18/307; C08G 18/2081; C08G 18/4009; C08G 18/4063; C08G 18/4216; C08G 18/4238; C08G 18/4808; C08G 18/4854; C08G 18/6254; C08G 18/7671; C08G 18/7657; C09J 175/04; C09J 175/08; C09J 2201/61; Y10T 428/31504; Y10T 428/31551
USPC ........... 428/423.1; 528/44, 85, 905; 526/935
See application file for complete search history.

(56) References Cited

U.S. PATENT DOCUMENTS

| | | | | |
|---|---|---|---|---|
| 5,880,167 A | * | 3/1999 | Krebs et al. ................... | 521/155 |
| 6,191,212 B1 | * | 2/2001 | Kube ............................ | 524/590 |
| 6,465,104 B1 | | 10/2002 | Krebs et al. | |
| 2010/0152394 A1 | * | 6/2010 | Slark et al. ................... | 525/452 |
| 2011/0287242 A1 | | 11/2011 | Kanagawa et al. | |
| 2014/0242396 A1 | * | 8/2014 | Kanagawa et al. ........ | 428/423.1 |

FOREIGN PATENT DOCUMENTS

| | | |
|---|---|---|
| JP | H10-265758 A | 10/1998 |
| JP | 2001-200029 A | 7/2001 |
| JP | 2003-027030 A | 1/2003 |
| JP | 2004-123833 A | 4/2004 |
| JP | 2008-248018 A | 10/2008 |
| JP | 2008-248152 A | 10/2008 |
| JP | 4240158 B1 | 3/2009 |
| JP | 2009-242557 A | 10/2009 |
| JP | 2009-286883 A | 12/2009 |
| WO | 2009/107301 A1 | 9/2009 |
| WO | 2011/115721 A2 | 9/2011 |

OTHER PUBLICATIONS

International Search Report, mailed May 14, 2013, which issued during the prosecution of International Patent Application No. PCT/JP2013/057235, which corresponds to the present application.

* cited by examiner

*Primary Examiner* — Thao T Tran
(74) *Attorney, Agent, or Firm* — McDermott Will & Emery LLP

(57) ABSTRACT

An object of the present invention is to provide a moisture-curable polyurethane hot-melt resin composition with superior properties such as water resistance, fast-curing properties, and flexibility. The present invention provides a moisture-curable polyurethane hot-melt resin composition containing an isocyanate-containing urethane prepolymer (i) that is a reaction product of polyols (A) including a polyether polyol (A-1), a crystalline polyester polyol (A-2), an amorphous polyester polyol (A-3), and an acrylic polyol (A-4) with a polyisocyanate (B); and a curing catalyst (ii) represented by general formula (1) below, and also provides an adhesive and article produced using the resin composition. The adhesive produced using the moisture-curable polyurethane hot-melt resin composition according to the present invention is suitable not only for the bonding of fibers and the lamination of construction materials, but also for the lamination of optical elements.

11 Claims, No Drawings

MOISTURE-CURABLE POLYURETHANE HOT-MELT RESIN COMPOSITION, ADHESIVE, AND ARTICLE

CROSS REFERENCE TO PRIOR APPLICATIONS

This application is a U.S. National Phase application under 35 U.S.C. §371 of International Application No. PCT/JP2013/057235, filed on Mar. 14, 2013 and claims benefit of priority to Japanese Patent Application No. 2012-090963, filed on Apr. 12, 2012 and Japanese Patent Application No. 2012-101082, filed on Apr. 26, 2012. The International Application was published in Japanese on Oct. 17, 2013 as WO 2013/153907 A1 under PCT Article 21(2). The contents of the above applications are hereby incorporated by reference.

TECHNICAL FIELD

The present invention relates to moisture-curable polyurethane hot-melt resin compositions with superior properties such as water resistance, fast-curing properties, and flexibility and to adhesives and articles using such moisture-curable polyurethane hot-melt resin compositions.

BACKGROUND ART

Various studies have been conducted on the use of moisture-curable polyurethane hot-melt adhesives, which are solvent-free, as environmentally compatible adhesives, particularly in the bonding of fibers and the lamination of construction materials, and they have been widely used in industry.

Recently, with the growing need for lighter and thinner optical elements, research has been directed to the lamination of optical elements using hot-melt adhesives instead of acrylic pressure-sensitive adhesives, which have been commonly used.

For example, an adhesive is disclosed that uses a moisture- and heat-resistant hot-melt adhesive composition containing (a) 100 parts by weight of a polyurethane resin having a flow onset temperature of 55° C. to 110° C., (b) 5 to 150 parts by weight of a saturated polyester resin having a Tg of 0° C. to 110° C. and a molecular weight of 10,000 to 25,000, (c) 10 to 150 parts by weight of an epoxy resin having a softening point of 60° C. to 140° C. and a molecular weight of 700 to 3,000, and (d) 10 to 200 parts by weight of an inorganic filler surface-treated with a coupling agent (see, for example, PTL 1).

This adhesive has a practical level of moisture and heat resistance. Unfortunately, this adhesive has insufficient water resistance; if a laminate formed using the adhesive is immersed in water, water may enter the laminate within a relatively short period of time.

Despite the advantage of low-temperature bonding, the above moisture- and heat-resistant hot-melt adhesive composition is impractical in situations where fast curing is desired. Another disadvantage is that this adhesive, which contains an epoxy resin, has insufficient flexibility and is therefore of limited use.

CITATION LIST

Patent Literature

PTL 1: Japanese Unexamined Patent Application Publication No. 2003-27030

SUMMARY OF INVENTION

Technical Problem

An object of the present invention is to provide a moisture-curable polyurethane hot-melt resin composition with superior properties such as water resistance, fast-curing properties, and flexibility.

Solution to Problem

While conducting research to achieve the foregoing object, the inventors have focused on the materials, such as polyols and curing catalysts, used for urethane prepolymers. After conducting intensive research, the inventors have completed the present invention.

Specifically, the present invention provides a moisture-curable polyurethane hot-melt resin composition containing an isocyanate-containing urethane prepolymer (i) that is a reaction product of polyols (A) including a polyether polyol (A-1), a crystalline polyester polyol (A-2), an amorphous polyester polyol (A-3), and an acrylic polyol (A-4) with a polyisocyanate (B); and a curing catalyst (ii) represented by general formula (1) below, and also provides an adhesive and article produced using the resin composition.

[Chem. 1]

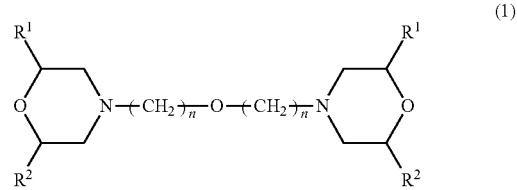

(1)

(where $R^1$ and $R^2$ are independently at each occurrence hydrogen or alkyl, and n is independently at each occurrence an integer of 1 to 6).

Advantageous Effects of Invention

The adhesive produced using the moisture-curable polyurethane hot-melt resin composition according to the present invention has superior water resistance, fast-curing properties, flexibility, adhesion to various substrates, workability during application, shape retention after application, and open time.

Thus, the adhesive produced using the moisture-curable polyurethane hot-melt resin composition according to the present invention is suitable not only for the bonding of fibers and the lamination of construction materials, but also for the lamination of optical elements.

If the moisture-curable polyurethane hot-melt resin composition according to the present invention further contains an acrylic resin (iii), superior drop impact resistance can also be imparted to, for example, an article produced using the moisture-curable polyurethane hot-melt resin composition.

DESCRIPTION OF EMBODIMENTS

A moisture-curable polyurethane hot-melt resin composition according to the present invention contains an isocyanate-containing urethane prepolymer (i) that is a reaction product of polyols (A) including a polyether polyol (A-1), a crystalline polyester polyol (A-2), an amorphous polyester polyol (A-3), and an acrylic polyol (A-4) with a polyisocyanate (B); and a curing catalyst (ii) represented by general formula (1) below.

The polyether polyol (A-1) is intended to adjust the melt viscosity and open time (time for which lamination is allowed) after application to a moderate level, thereby imparting superior properties such as workability, adhesion, water resistance, and flexibility. Examples of polyether polyols (A-1) include polyethylene glycol, polypropylene glycol, polybutylene glycol, polytetramethylene glycol, and ethylene-oxide-modified polypropylene glycol.

The polyether polyol (A-1) preferably has a number average molecular weight of 500 to 5,000, more preferably 700 to 5,000, for reasons of adhesion (particularly, initial adhesion strength and final adhesion strength) and moderate open time after application. The number average molecular weight of the polyether polyol is measured by gel permeation chromatography (GPC) under the following conditions.

Measurement system: high-speed GPC system ("HLC-8220 GPC" from Tosoh Corporation)
Columns: the following columns available from Tosoh Corporation are used in a series configuration:
"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1
Detector: differential refractive index detector (RI)
Column temperature: 40° C.
Eluent: tetrahydrofuran (THF)
Flow rate: 1.0 mL/min
Injection volume: 100 µL (tetrahydrofuran solution with sample concentration of 0.4% by mass)
Standards: the following polystyrene standards are used to create a calibration curve.
(Polystyrene Standards)
"TSKgel Polystyrene Standard A-500" from Tosoh Corporation
"TSKgel Polystyrene Standard A-1000" from Tosoh Corporation
"TSKgel Polystyrene Standard A-2500" from Tosoh Corporation
"TSKgel Polystyrene Standard A-5000" from Tosoh Corporation
"TSKgel Polystyrene Standard F-1" from Tosoh Corporation
"TSKgel Polystyrene Standard F-2" from Tosoh Corporation
"TSKgel Polystyrene Standard F-4" from Tosoh Corporation
"TSKgel Polystyrene Standard F-10" from Tosoh Corporation
"TSKgel Polystyrene Standard F-20" from Tosoh Corporation
"TSKgel Polystyrene Standard F-40" from Tosoh Corporation
"TSKgel Polystyrene Standard F-80" from Tosoh Corporation
"TSKgel Polystyrene Standard F-128" from Tosoh Corporation
"TSKgel Polystyrene Standard F-288" from Tosoh Corporation
"TSKgel Polystyrene Standard F-550" from Tosoh Corporation The crystalline polyester polyol (A-2) is essential for imparting properties such as water resistance, adhesion (particularly, initial adhesion strength), and moderate open time. The crystalline polyester polyol (A-2) may be, for example, a reaction product of a hydroxyl-containing compound with a polybasic acid. As used herein, the term "crystalline" refers to a material that shows a peak due to the heat of crystallization or the heat of fusion in differential scanning calorimetry (DSC) in accordance with JIS K 7121, whereas the term "amorphous" refers to a material that shows no such peak.

Examples of hydroxyl-containing compounds include ethylene glycol, propylene glycol, butanediol, pentanediol, hexanediol, heptanediol, octanediol, nonanediol, decanediol, trimethylolpropane, trimethylolethane, and glycerol. These compounds may be used alone or in combination. In particular, butanediol, hexanediol, octanediol, and decanediol are preferred to increase the crystallinity and thereby improve the water resistance and adhesion.

Examples of polybasic acids include oxalic acid, malonic acid, succinic acid, adipic acid, sebacic acid, azelaic acid, and 1,12-dodecanedicarboxylic acid.

The crystalline polyester polyol (A-2) preferably has a number average molecular weight of 500 to 5,000, more preferably 1,000 to 4,000, for reasons of water resistance and adhesion. The number average molecular weight of the crystalline polyester polyol (A-2) is measured in the same manner as the number average molecular weight of the polyether polyol (A-1).

The crystalline polyester polyol (A-2) preferably has a glass transition temperature (Tg) of 40° C. to 130° C. The glass transition temperature of the crystalline polyester polyol (A-2) is measured by DSC in accordance with JIS K 7121-1987. Specifically, the glass transition temperature is determined as the midpoint glass transition temperature (Tmg) read from a DSC curve obtained when the crystalline polyester polyol (A-2) is placed in a DSC system, is heated to (Tg+50° C.) at a heating rate of 10° C./min, is maintained at that temperature for 3 minutes, and is quenched.

The crystalline polyester polyol (A-2) is preferably used in an amount of 20 to 150 parts by mass, more preferably 30 to 100 parts by mass, based on 100 parts by mass of the ether polyol (A-1) for reasons of properties such as flexibility, adhesion, and open time.

The crystalline polyester polyol (A-2) may also be a polycaprolactone polyol. The polycaprolactone polyol may be, for example, a reaction product of a hydroxyl-containing compound with ε-caprolactone.

If (A-2) is a polycaprolactone polyol, it preferably has a number average molecular weight of 20,000 to 200,000.

The amorphous polyester polyol (A-3) is intended to adjust the melt viscosity and open time (time for which lamination is allowed) after application to a moderate level, thereby imparting superior properties such as workability, adhesion, water resistance, and flexibility. The amorphous polyester polyol (A-3) may be, for example, a reaction product of a hydroxyl-containing compound as illustrated below with a polybasic acid.

Examples of hydroxyl-containing compounds include ethylene glycol, propylene glycol, 1,4-butanediol, pentanediol, 2,4-diethyl-1,5-pentanediol, 3-methyl-1,5-pentanediol, hexanediol, neopentyl glycol, hexamethylene glycol, glycerol, trimethylolpropane, bisphenol A, bisphenol F, and alkylene oxide adducts thereof. In particular, alkylene oxide adducts of bisphenol A are preferred to improve the properties such as water resistance, adhesion, and flexibility. The number of moles of alkylene oxide added is preferably 2 to 10 mol, more preferably 4 to 8 mol.

Examples of polybasic acids include adipic acid, glutaric acid, pimelic acid, suberic acid, dimer acid, sebacic acid, undecanedicarboxylic acid, hexahydroterephthalic acid, phthalic acid, phthalic anhydride, isophthalic acid, and terephthalic acid.

The amorphous polyester polyol (A-3) preferably has a number average molecular weight of 500 to 5,000, more preferably 1,000 to 4,000, even more preferably 1,000 to 3,000, to improve the properties such as water resistance, adhesion, and flexibility. The number average molecular weight of the amorphous polyester polyol (A-3) is measured in the same manner as the number average molecular weight of the polyether polyol (A-1).

The amorphous polyester polyol (A-3) preferably has a glass transition temperature of −70° C. to −10° C. to improve the properties such as water resistance, adhesion, and flexibility. The glass transition temperature of the amorphous polyester polyol (A-3) is measured in the same manner as the glass transition temperature (Tg) of the crystalline polyester polyol (A-2).

The amorphous polyester polyol (A-3) is preferably used in an amount of 20 to 150 parts by mass, more preferably 25 to 130 parts by mass, even more preferably 55 to 100 parts by mass, based on 100 parts by mass of the ether polyol (A-1) to improve the properties such as water resistance, flexibility, and particularly, adhesion.

The acrylic polyol (A-4) is intended to adjust the open time (time for which lamination is allowed) after application to a moderate level, thereby imparting superior properties such as workability, water resistance, and adhesion. The acrylic polyol (A-4) is a polymer of (meth)acrylic compounds including a hydroxyl-containing (meth)acrylic compound, which is essential. As used herein, the term "(meth) acrylic compound" refers to one or both of a methacrylic compound and an acrylic compound.

Examples of hydroxyl-containing (meth)acrylic compounds include 2-hydroxyethyl(meth)acrylate, hydroxypropyl(meth)acrylate, and hydroxybutyl(meth)acrylate.

Examples of other (meth)acrylic compounds include (meth)acrylic acid; alkyl(meth)acrylates alkyl(meth)acrylates such as methyl(meth)acrylate, ethyl(meth)acrylate, n-butyl(meth)acrylate, isobutyl(meth)acrylate, tert-butyl (meth)acrylate, neopentyl(meth)acrylate, 2-ethylhexyl (meth)acrylate, octyl(meth)acrylate, stearyl(meth)acrylate, isostearyl(meth)acrylate, cetyl(meth)acrylate, and lauryl (meth)acrylate; fluorine-containing (meth)acrylic compounds such as 2,2,2-trifluoroethyl(meth)acrylate, 2,2,3,3-tetrafluoropropyl(meth)acrylate, 1H,1H,5H-octafluoropentyl(meth)acrylate, and 2-(perfluorooctyl)ethyl (meth)acrylate; alicyclic(meth)acrylic compounds such as isobornyl(meth)acrylate, cyclohexyl(meth)acrylate, dicyclopentanyl(meth)acrylate, and dicyclopentenyloxyethyl(meth) acrylate; ether-containing (meth)acrylic compounds such as polyethylene glycol mono(meth)acrylate, methoxyethyl (meth)acrylate, methoxybutyl(meth)acrylate, methoxytriethylene glycol(meth)acrylate, and methoxypolyethylene glycol(meth)acrylate; and other (meth)acrylic compounds such as benzyl(meth)acrylate, 2-ethyl-2-methyl-[1,3]-dioxolan-4-yl-methyl(meth)acrylate, and dimethylaminoethyl (meth)acrylate. These (meth)acrylic compound may be used alone or in combination. In particular, hydroxyl-containing (meth)acrylic compounds and alkyl(meth)acrylates are preferred to improve the properties such as water resistance, adhesion, and open time, including 2-hydroxyethyl(meth) acrylate, methyl(meth)acrylate, and n-butyl(meth)acrylate.

The acrylic polyol (A-4) preferably has a number average molecular weight of 5,000 to 50,000, more preferably 10,000 to 30,000, to improve the properties such as water resistance, adhesion, and open time. The number average molecular weight of the acrylic polyol (A-4) is measured in the same manner as the number average molecular weight of the polyether polyol (A-1).

The acrylic polyol (A-4) preferably has a glass transition temperature of 30° C. to 120° C., more preferably 50° C. to 80° C., to improve the properties such as water resistance, adhesion (particularly, initial adhesion strength due to improved cohesion), and open time. The glass transition temperature of the acrylic polyol (A-4) is measured in the same manner as the glass transition temperature (Tg) of the crystalline polyester polyol (A-2).

The acrylic polyol (A-4) is preferably used in an amount of 20 to 400 parts by mass, more preferably 25 to 200 parts by mass, even more preferably 35 to 150 parts by mass, based on 100 parts by mass of the ether polyol (A-1) to improve the properties such as water resistance, open time, and particularly, adhesion.

The polyols (A), including (A-1) to (A-4), may be used in combination with other polyols, such as polycarbonate polyols, polybutadiene polyols, and dimer diols, provided that they do not interfere with the advantages of the present invention.

The polyisocyanate (B) is preferably a diisocyanate. Examples of polyisocyanates (B) include aromatic polyisocyanates such as polymethylenepolyphenyl polyisocyanate, diphenylmethane diisocyanate, carbodiimide-modified diphenylmethane diisocyanate isocyanate, phenylene diisocyanate, tolylene diisocyanate, and naphthalene diisocyanate; and aliphatic and alicyclic polyisocyanates such as hexamethylene diisocyanate, lysine diisocyanate, cyclohexane diisocyanate, isophorone diisocyanate, dicyclohexylmethane diisocyanate, xylylene diisocyanate, and tetramethylxylylene diisocyanate. In particular, diphenylmethane diisocyanate is preferred for reasons of properties such as reactivity and adhesion.

The polyisocyanate (B) is preferably used in an amount of 10 to 50 parts by mass, more preferably 10 to 30 parts by mass, based on 100 parts by mass of the moisture-curable polyurethane hot-melt resin composition according to the present invention for reasons of properties such as viscosity.

The urethane prepolymer (i), which is a reaction product of the polyols (A) with the polyisocyanate (B), has isocyanate groups, at the polymer ends and in the molecule thereof, that can react with moisture present in air or a housing or adherend to which the urethane prepolymer is applied to form a crosslinked structure.

The urethane prepolymer (i) can be manufactured, for example, by adding a mixture of the polyols (A) dropwise to a reaction vessel containing the polyisocyanate (B) and reacting the mixture by heating under such conditions that the isocyanate groups of the polyisocyanate (B) are present in a larger amount than the hydroxyl groups of the polyols (A).

In the manufacture of the urethane prepolymer (i), the equivalent ratio ([isocyanate/hydroxyl]) of the isocyanate groups of the polyisocyanate (B) to the hydroxyl groups of the polyols (A) is preferably 1.1 to 5.0, more preferably 1.5 to 3.0, for reasons of water resistance, adhesion, and flexibility.

Although the urethane prepolymer (i) can generally be manufactured in the absence of a solvent, it may be manufactured by reacting the polyols (A) with the polyisocyanate (B) in an organic solvent. If the reaction is performed in an organic solvent, an organic solvent that does not interfere with the reaction, such as ethyl acetate, n-butyl acetate, methyl ethyl ketone, or toluene, can be used, although the organic solvent has to be removed during or after the completion of the reaction by a method such as heating under reduced pressure.

A urethanization catalyst can optionally be used in the manufacture of the urethane prepolymer (i). The urethanization catalyst can be added in any stage of the reaction.

Examples of urethanization catalysts include nitrogen-containing compounds such as triethylamine, triethylenediamine, and N-methylmorpholine; metal salts such as potassium acetate, zinc stearate, and tin octylate; and organometallic compounds such as dibutyltin dilaurate.

The urethane prepolymer (i) produced by the above method preferably has an isocyanate content (hereinafter, NCO %) of 1.5% to 8.0%, more preferably 1.7 to 5.0, even more preferably 1.8 to 3.0, to further improve the water resistance, adhesion, and flexibility. The NCO % of the urethane prepolymer (i) is measured by potentiometric titration in accordance with JIS K 1603-1.

The urethane prepolymer (i) preferably has a viscosity, i.e., a melt viscosity at 125° C., of 1,000 to 50,000 mPa·s, more preferably 2,000 to 10,000 mPa·s. The melt viscosity at 125° C. is measured with a cone-and-plate viscometer (available from ICI).

The urethane prepolymer (i) preferably has a softening point of 30° C. to 120° C. for reasons of water resistance, adhesion, and workability. The softening point is the temperature at which a urethane prepolymer starts flowing and loses its cohesion when heated stepwise. The softening point of the urethane prepolymer (i) is determined by the ball-and-ring method in accordance with JIS K 5902.

The curing catalyst (ii) is intended to improve the fast-curing properties without adversely affecting the properties such as water resistance, flexibility, and adhesion. It is essential to use a curing catalyst represented by general formula (1) below.

[Chem. 2]

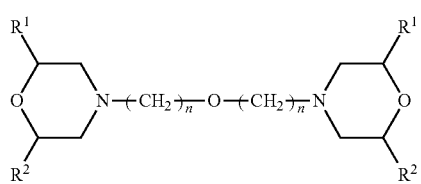

(1)

(where $R^1$ and $R^2$ are independently at each occurrence hydrogen or alkyl, and n is independently at each occurrence an integer of 1 to 6).

In particular, dimorpholinodiethyl ether, which is represented by general formula (2) below, and bis(2,6-dimethylmorpholinoethyl) ether, which is represented by structural formula (3) below, are preferred as the curing catalyst (ii) to improve the properties such as fast-curing properties and thermal stability.

[Chem. 3]

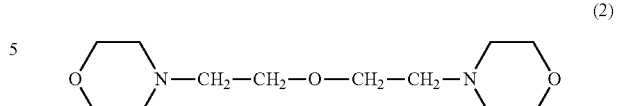

(2)

[Chem. 4]

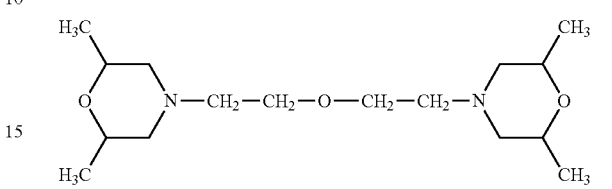

(3)

The curing catalyst (ii) is preferably used in an amount of 0.05 to 5.0 parts by mass, more preferably 0.05 to 2.0 parts by mass, based on 100 parts by mass of the urethane prepolymer (ii) to improve the properties such as fast-curing properties and manufacturing stability.

The moisture-curable polyurethane hot-melt resin composition according to the present invention preferably further contains the acrylic resin (iii), which imparts superior drop impact resistance.

The acrylic resin (iii), which, in particular, is essential for imparting superior drop impact resistance, is a polymer of a (meth)acrylic compound. The (meth)acrylic compound the (meth)acrylic compound may be similar to those used for the acrylic polyol (A-4).

The (meth)acrylic compound used as the raw material for the acrylic resin (iii) is preferably an alkyl(meth)acrylate having an alkyl group with 1 to 10 carbon atoms and/or a hydroxyl-containing (meth)acrylate. In particular, the (meth)acrylic compound is preferably at least one selected from the group consisting of ethyl(meth)acrylate, butyl(meth)acrylate, and 2-hydroxyethyl(meth)acrylate.

If an alkyl(meth)acrylate having an alkyl group with 1 to 10 carbon atoms and a hydroxyl-containing (meth)acrylate are used in combination, they are preferably used in a mass ratio ([alkyl(meth)acrylate having alkyl group with 1 to 10 carbon atoms]/[hydroxyl-containing (meth)acrylate]) of 99.1/0.9 to 99.9/0.1 for reasons of properties such as drop impact resistance.

The acrylic resin (iii) preferably has a number average molecular weight of 1,000 to 200,000, more preferably 1,000 to 100,000, to improve the properties such as drop impact resistance. The number average molecular weight of the (meth)acrylic resin (iii) is measured in the same manner as the number average molecular weight of the polyether polyol (A-1).

The acrylic resin (iii) preferably has a glass transition temperature of 0° C. or lower, more preferably 0° C. to −80° C., even more preferably −10° C. to −50° C., to improve the properties such as drop impact resistance. The glass transition temperature of the (meth)acrylic resin (iii) is measured in the same manner as the glass transition temperature (Tg) of the crystalline polyester polyol (A-2).

The acrylic resin (iii) is preferably used in an amount of 0.5 to 50 parts by mass, more preferably 1 to 30 parts by mass, even more preferably 2 to 20 parts by mass, based on 100 parts by mass of the polyols (A) to further improve the properties such as drop impact resistance.

The acrylic resin (iii) may be added as follows. For example, the acrylic resin (iii) may be added and mixed after the prepolymer (i) is manufactured, or may be mixed with the polyols (A) before the polyisocyanate (B) is fed and reacted to manufacture the prepolymer (i).

Next, the moisture-curable polyurethane hot-melt resin composition according to the present invention will be described.

Although the moisture-curable polyurethane hot-melt resin composition according to the present invention may be composed of two components, i.e., the urethane prepolymer (i) and the curing catalyst (ii), or if drop impact resistance is to be imparted, of three components, i.e., the acrylic resin (iii) in addition to the two components, the resin composition may optionally contain other additives.

Examples of other additives include antioxidants, tackifiers, plasticizers, stabilizers, fillers, dyes, pigments, fluorescent whiteners, silane coupling agents, waxes, and thermoplastic resins.

An adhesive prepared using the above moisture-curable polyurethane hot-melt resin composition according to the present invention has superior water resistance, fast-curing properties, flexibility, adhesion to various substrates, workability during application, shape retention after application, and open time, and is suitable not only for the bonding of fibers and the lamination of construction materials, but also for the lamination of optical elements.

Examples of uses for the lamination of optical elements include sealants for devices such as cellular phones, personal computers, gaming devices, televisions, car navigation systems, and camera speakers.

In lamination, for example, the moisture-curable polyurethane hot-melt resin composition may be melted by heating in the temperature range of 50° C. to 130° C., be applied to one member, and be overlaid with another member to produce an article.

Examples of materials for the members include glass, acrylic resins, urethane resins, silicone resins, epoxy resins, fluorocarbon resins, polystyrene resins, polyester resins, polysulfone resins, polyarylate resins, polyvinyl chloride resins, polyvinylidene chloride resins, cycloolefin resins such as norbornene resins, polyolefin resins, polyimide resins, alicyclic polyimide resins, cellulose resins, polycarbonates (PC), polybutylene terephthalate (PBT), modified polyphenylene ether (PPE), polyethylene naphthalate (PEN), polyethylene terephthalate (PET), lactic acid polymers, ABS resins, and AS resins. The members may optionally be subjected to a treatment such as corona treatment, plasma treatment, or primer treatment.

The moisture-curable polyurethane hot-melt resin composition can be applied, for example, using a roller coater, spray coater, T-die coater, knife coater, or comma coater. The moisture-curable polyurethane hot-melt resin composition according to the present invention, which has properties such as low viscosity and shape retention after application, can also be applied by a process such as dispensing, inkjet printing, screen printing, or offset printing. These application processes allow the moisture-curable polyurethane hot-melt resin composition to be applied to the members at the desired position, which is preferred in that no loss due to processing such as punching occurs. These application processes also allow the moisture-curable polyurethane hot-melt resin composition to be continuously or intermittently applied to the members in various patterns such as dots, lines, triangles, rectangles, circles, and curves.

An adhesive layer formed using the moisture-curable polyurethane hot-melt resin composition may have any thickness depending on the application. For example, the adhesive layer preferably has a thickness of 10 μm to 5 mm.

After lamination, aging may be performed, for example, at a temperature of 20° C. to 80° C. and a relative humidity of 50% to 90% RH for 0.5 to 5 days.

EXAMPLES

The present invention is further illustrated by the following examples.

Example Synthesis 1

Synthesis of Acrylic Polyol-1

In a reaction vessel equipped with a thermometer, a stirrer, and a condenser were placed 300 parts by mass of methyl ethyl ketone. After the temperature inside the vessel was raised to 80° C., a solution of 340 parts by mass of methacrylic acid, 340 parts by mass of butyl methacrylate, 10 parts by mass of 2-hydroxyethyl methacrylate, and 8.5 parts by mass of azobisisobutyronitrile in 160 parts by mass of methyl ethyl ketone was added and mixed, and the mixture was reacted for 16 hours to obtain acrylic polyol-1 (nonvolatile content: 52% by mass, viscosity: 20,000 mPa·s (23° C.)).

Example 1

In a four-necked flask equipped with a thermometer, a stirrer, an inert gas inlet, and a reflux condenser were placed 15 parts by mass of polypropylene glycol (number average molecular weight: 1,000, hereinafter abbreviated as "PPG 1000"), 15 parts by mass of polypropylene glycol (number average molecular weight: 2,000, hereinafter abbreviated as "PPG 2000"), 20 parts by mass of crystalline PEs-2 (reaction product of 1,6-hexanediol and 1,12-dodecanedicarboxylic acid, number average molecular weight: 3,500), 7.5 parts by mass of amorphous PEs-1 (reaction product of adduct of bisphenol A with 6 mol of propylene oxide, sebacic acid, and isophthalic acid, number average molecular weight: 2,000), 7.5 parts by mass of amorphous PEs-2 (reaction product of neopentyl glycol, diethylene glycol, 1,6-hexanediol, and adipic acid, number average molecular weight: 2,000), and 20 parts by mass of acrylic polyol-1. The polyol mixture was dehydrated to a water content of 0.05% by mass or less at 100° C. under reduced pressure.

After the temperature inside the vessel was lowered to 70° C., 15.5 parts by mass of 4,4'-diphenylmethane diisocyanate (MDI) was added, and the mixture was heated to 100° C. and was reacted for about 3 hours until a constant NCO content was reached to obtain an isocyanate-containing urethane prepolymer.

To the urethane prepolymer was added 0.1 part by mass of bis(2,6-dimethylmorpholinoethyl) ether to obtain a moisture-curable polyurethane hot-melt resin composition.

Examples 2 to 7 and Comparative Examples 1 to 6

Moisture-curable polyurethane hot-melt resin compositions were prepared as in Example 1 except that the types and/or amounts of polyols, the amount of polyisocyanate, and the type and/or amount of curing catalyst were changed as shown in Tables 1 and 2.

[Methods for Evaluation of Workability During Application, Shape Retention after Application, and Open Time]

Each of the moisture-curable polyurethane hot-melt resin compositions prepared in the Examples and Comparative Examples was melted by heating to 120° C. and was dispensed using a dispenser needle ("VALVE MASTER ME-5000VT", Musashi Engineering, Inc.) having an inner diameter of 0.6 mm and preheated to 120° C. at a dispensing pressure of 0.3 MPa and a speed of 50 mm/sec for 10 seconds. The resin composition was rated for workability during application based on the amount (g) of resin composition applied as follows. The resin composition was also applied to a housing (acrylic sheet) under the same conditions and was rated for shape retention after application based on the height (mm) of the adhesive layer immediately after application as follows. In the shape retention test, the adhesive layer was also examined for tack by finger touch every 1 minute after application and was rated based on the time (minutes) taken for surface tack to disappear as follows. The resin compositions that gelled immediately after the addition of the curing catalyst were not subjected to the subsequent evaluations and are indicated by "-" in the tables.

<Workability During Application>
"A": 0.25 to less than 0.5 g
"B": 0.1 to less than 0.25 g
"C": less than 0.1 g <Shape Retention after Application>
"A": 0.36 mm or more
"B": 0.24 to less than 0.36 mm
"C": less than 0.24 mm <Open Time>
"Y": 4 to less than 10 minutes
"N": less than 4 minutes or not less than 10 minutes

[Method for Evaluation of Flexibility]

The adhesive layer formed as described above (methods for evaluation of shape retention after application and open time) was tested for mechanical properties (modulus at 100% (MPa), stress at break (MPa), and elongation at break (%)) in accordance with JIS K-7311 and was rated based on the modulus at 100% as follows:

"A": less than 6.0 MPa
"B": 6.0 to less than 10.0 MPa
"C": 10.0 MPa or more

[Method for Evaluation of Adhesion Strength to Substrate]

Each of the moisture-curable polyurethane hot-melt resin compositions prepared in the Examples and Comparative Examples was melted by heating to 120° C. and was applied at a thickness of 100 µm to corona-treated PET sheets having a thickness of 200 µm using a roller coater. The PET sheets were laminated on various substrates (acrylonitrile-butadiene-styrene copolymer resin (ABS) sheet, polycarbonate (PC) sheet, and acrylic sheet) and were kept in a thermostatic bath at 23° C. and 65% RH for three days. Thereafter, the peel strength (N/inch) at 180° C. was measured in accordance with JIS K-7311.

[Method for Evaluation of Fast-Curing Properties]

Each of the moisture-curable polyurethane hot-melt resin compositions prepared in the Examples and Comparative Examples was melted by heating to 120° C. and was applied at a thickness of 100 µm to a corona-treated PET sheet having a thickness of 200 µm using a roller coater, and the PET sheet was laminated on a similar PET sheet. Three minutes after lamination, a load of 1 kg was applied to the PET laminate in the 90° direction in an atmosphere at 30° C., and the laminate was examined for peeling over time every 1 hour. A laminate that did not peel was rated as "Y", and a laminate that peeled was rated as "N".

[Method for Evaluation of Water Resistance]

Each of the moisture-curable polyurethane hot-melt resin compositions prepared in the Examples and Comparative Examples was melted by heating to 120° C. and was dispensed onto a PC mold sheet (5 cm×5 cm) in a square pattern using a dispenser needle ("VALVE MASTER ME-5000VT", Musashi Engineering, Inc.) having an inner diameter of 0.6 mm and preheated to 120° C. at a dispensing pressure of 0.3 MPa and a speed of 50 mm/sec, and the PC sheet was laminated on an ABS sheet to produce an article. After immersion in water (at 23° C. for 0.5 hour), the article was examined for entry of water in accordance with JIS IPX-7 and was rated as follows:

"Y": No water entered.
"N": Water entered.

TABLE 1

| | Example 1 | Example 2 | Example 3 | Example 4 | Example 5 | Example 6 | Example 7 |
|---|---|---|---|---|---|---|---|
| Polyol (A) | | | | | | | |
| Polyether polyol (A-1) | | | | | | | |
| PPG1000 | 15 | 15 | 15 | 15 | 15 | 15 | 15 |
| PPG2000 | 15 | 15 | 15 | 15 | 15 | 15 | 15 |
| Crystalline polyester polyol (A-2) | | | | | | | |
| Crystalline PEs-1 | | 10 | 10 | 10 | | | |
| Crystalline PEs-2 | 20 | 10 | 10 | 10 | 20 | 30 | 10 |
| Amorphous polyester polyol (A-3) | | | | | | | |
| Amorphous PEs-1 | 7.5 | 15 | 15 | 15 | 15 | 15 | 15 |
| Amorphous PEs-2 | 7.5 | | | | | | |
| Acrylic polyol (A-4) | | | | | | | |
| Acrylic polyol-1 | 20 | 20 | 20 | 20 | 20 | 10 | 30 |

TABLE 1-continued

|  | Example 1 | Example 2 | Example 3 | Example 4 | Example 5 | Example 6 | Example 7 |
|---|---|---|---|---|---|---|---|
| Polyisocyanate (B) | | | | | | | |
| MDI | 15.5 | 15.4 | 15.4 | 15.4 | 16.0 | 17.0 | 15.5 |
| Curing catalyst (ii) | | | | | | | |
| Bis(2,6-dimethylmorpholinoethyl) ether | 0.1 | 0.1 | 0.5 | | 0.1 | 0.1 | 0.1 |
| Dimorpholinodiethyl ether | | | | 0.1 | | | |
| Properties of polyurethane hot melt | | | | | | | |
| NCO % | 2.4 | 2.1 | 2.1 | 2.1 | 2.2 | 2.3 | 2.3 |
| Melt viscosity (mPa · s, 125° C.) | 3,950 | 4,100 | 4,250 | 4,100 | 4,100 | 3,900 | 4,400 |
| Workability during application | A | A | A | A | A | A | A |
| Shape retention after application | A | A | A | A | A | A | B |
| Open time (min) | 6 | 7 | 6.5 | 7 | 7 | 4 | 9 |
| Flexibility evaluation | A | A | A | A | A | B | A |
| Mechanical properties | | | | | | | |
| Modulus at 100% (MPa) | 5.4 | 5.0 | 4.5 | 5.0 | 4.5 | 6.8 | 3.9 |
| Stress at break (MPa) | 23 | 24 | 22 | 24 | 24.5 | 22.5 | 23 |
| Elongation at break (%) | 1,100 | 1,200 | 1,350 | 1,200 | 1,180 | 780 | 1,000 |
| Adhesion strength to substrate (N/inch) | | | | | | | |
| ABS | 40 | 45 | 40 | 45 | 32 | 24 | 35 |
| PC | 40 | 45 | 40 | 45 | 32 | 24 | 35 |
| Acrylic | 37 | 35 | 32 | 35 | 32 | 24 | 35 |
| Fast-curing properties (creep resistance test) | | | | | | | |
| After 1 hour | N | N | N | N | N | N | N |
| After 2 hours | N | N | Y | N | N | N | N |
| After 3 hours | Y | Y | Y | Y | Y | Y | Y |
| After 4 hours | Y | Y | Y | Y | Y | Y | Y |
| Water resistance | Y | Y | Y | Y | Y | Y | Y |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Polyol (A) | | | | | | |
| Polyether polyol (A-1) | | | | | | |
| PPG1000 | | 20 | 15 | 15 | 15 | 15 |
| PPG2000 | | 20 | 15 | 15 | 15 | 15 |
| PTMG1000 | | | | | | |
| PTMG2000 | | | | | | |
| Crystalline polyester polyol (A-2) | | | | | | |
| Crystalline PEs-1 | | | | | | |
| Crystalline PEs-2 | 30 | | 25 | 30 | 20 | 20 |
| Crystalline PEs-3 | | | | | | |
| Amorphous polyester polyol (A-3) | | | | | | |
| Amorphous PEs-1 | 25 | 20 | | 25 | 7.5 | 7.5 |
| Amorphous PEs-2 | | | | | 7.5 | 7.5 |
| Acrylic polyol (A-4) | | | | | | |
| Acrylic polyol-1 | 30 | 30 | 30 | | 20 | 20 |
| Polyisocyanate (B) | | | | | | |
| MDI | 12.4 | 17.5 | 14.7 | 18.0 | 15.5 | 15.5 |
| Curing catalyst (ii) | | | | | | |
| Bis(2,6-dimethylmorpholinoethyl) ether | 0.1 | 0.1 | 0.1 | 0.1 | | |
| Other catalysts | | | | | | |
| Dibutyltin dilaurate | | | | | 0.1 | |
| Trioctylamine | | | | | | 0.1 |
| Properties of polyurethane hot melt | | | | | | |
| NCO % | 2.3 | 2.2 | 2.3 | 2.3 | 2.4 | 2.4 |
| Melt viscosity (mPa · s, 125° C.) | 5,600 | 4,000 | 4,100 | 3,000 | 3,950 | 3,950 |
| Workability during application | C | A | A | A | — | — |
| Shape retention after application | A | C | A | A | — | — |

TABLE 2-continued

|  | Comparative Example 1 | Comparative Example 2 | Comparative Example 3 | Comparative Example 4 | Comparative Example 5 | Comparative Example 6 |
|---|---|---|---|---|---|---|
| Open time (min) | 6 | 15 | 5 | 3 | — | — |
| Flexibility evaluation | B | A | C | B | — | — |
| Mechanical properties | | | | | | |
| Modulus at 100% (MPa) | 8 | 3 | 10 | 6 | — | — |
| Stress at break (MPa) | 22 | 25 | 16 | 25 | — | — |
| Elongation at break (%) | 800 | 1,300 | 700 | 900 | — | — |
| Adhesion strength to substrate (N/inch) | | | | | | |
| ABS | 20 | 20 | 5 | 10 | — | — |
| PC | 20 | 20 | 10 | 10 | — | — |
| Acrylic | 29 | 15 | 10 | 10 | — | — |
| Fast-curing properties (creep resistance test) | | | | | | |
| After 1 hour | N | N | N | N | — | — |
| After 2 hours | N | N | N | N | — | — |
| After 3 hours | Y | Y | Y | Y | — | — |
| After 4 hours | Y | Y | Y | Y | — | — |
| Water resistance | N | N | N | N | — | — |

The abbreviations in Tables 1 and 2 are described below:

"Crystalline PEs-1": reaction product of 1,6-hexanediol and adipic acid, number average molecular weight: 2,000

"Amorphous PEs-2": reaction product of neopentyl glycol, diethylene glycol, 1,6-hexanediol, and adipic acid, number average molecular weight: 2,000

Example 8

In a four-necked flask equipped with a thermometer, a stirrer, an inert gas inlet, and a reflux condenser were placed 15 parts by mass of PPG 1000, 15 parts by mass of PPG 2000, 10 parts by mass of crystalline PEs-1, 10 parts by mass of crystalline PEs-2, 15 parts by mass of amorphous PEs-1, 20 parts by mass of acrylic polyol-1, and 2.5 parts by mass of (meth)acrylic resin-1 (reaction product of butyl acrylate, butyl methacrylate, ethyl acrylate, and 2-hydroxyethyl methacrylate in a ratio (by mass) of 69.65/25/5/0.35, number average molecular weight: 13,000, glass transition temperature: −30.3° C.). The mixture was dehydrated to a water content of 0.05% by mass or less under reduced pressure.

After the temperature inside the vessel was lowered to 70° C., 16.5 parts by mass of 4,4′-diphenylmethane diisocyanate (MDI) was added, and the mixture was heated to 100° C. and was reacted for about 3 hours until a constant NCO content was reached to obtain an isocyanate-containing urethane prepolymer.

To the urethane prepolymer was added 0.1 part by mass of bis(2,6-dimethylmorpholinoethyl) ether to obtain a moisture-curable polyurethane hot-melt resin composition.

Examples 9 to 19 and Comparative Examples 7 to 12

Moisture-curable polyurethane hot-melt resin compositions were prepared as in Example 8 except that the types and/or amounts of polyols, the amount of polyisocyanate, and the type and/or amount of curing catalyst were changed as shown in Tables 3 to 5.

[Method for Evaluation of Drop Impact Resistance]

Each of the moisture-curable polyurethane hot-melt resin compositions prepared in the Examples and Comparative Examples was melted by heating to 120° C. and was dispensed onto a PC sheet (5 cm×5 cm) in a 4 cm×4 cm square pattern using a dispenser needle ("VALVE MASTER ME-5000VT", Musashi Engineering, Inc.) having an inner diameter of 0.6 mm and preheated to 120° C. at a dispensing pressure of 0.3 MPa and a speed of 50 mm/sec. The PC sheet was laminated on an ABS sheet and was left standing at 23° C. and 65% RH for 3 days.

Using a DuPont-type drop impact tester, impact was applied to the ABS sheet with a punch therebetween five times at a load of 300 g and a height of 30 cm, and the PC sheet was visually inspected for peeling and was rated as follows:

"Y": No peeling occurred.

"N": Peeling occurred.

TABLE 3

|  | Example 8 | Example 9 | Example 10 | Example 11 | Example 12 | Example 13 | Example 14 |
|---|---|---|---|---|---|---|---|
| Polyol (A) | | | | | | | |
| Polyether polyol (A-1) | | | | | | | |
| PPG1000 | 15 | 15 | 15 | 20 | 10 | 10 | |
| PPG2000 | 15 | 15 | 15 | 20 | 10 | 10 | |
| PTMG1000 | | | | | | | 15 |
| PTMG2000 | | | | | | | 15 |
| Crystalline polyester polyol (A-2) | | | | | | | |
| Crystalline PEs-1 | 10 | 10 | 10 | | | | |
| Crystalline PEs-2 | 10 | 10 | 10 | 15 | 20 | 10 | 20 |

TABLE 3-continued

|  | Example 8 | Example 9 | Example 10 | Example 11 | Example 12 | Example 13 | Example 14 |
|---|---|---|---|---|---|---|---|
| Amorphous polyester polyol (A-3) | | | | | | | |
| Amorphous PEs-1 | 15 | 15 | 15 | 10 | 20 | 20 | 15 |
| Amorphous PEs-2 | | | | | | | |
| Acrylic polyol (A-4) | | | | | | | |
| Acrylic polyol-1 | 20 | 20 | 20 | 20 | 20 | 30 | 20 |
| Polyisocyanate (B) | | | | | | | |
| MDI | 16.5 | 16.0 | 15.5 | 17.0 | 15.0 | 14.5 | 16.0 |
| Curing catalyst (ii) | | | | | | | |
| Bis(2,6-dimethylmorpholinoethyl) ether | 0.1 | 0.1 | 0.1 | 0.1 | 0.1 | 0.1 | 0.1 |
| Dimorpholinodiethyl ether | | | | | | | |
| (Meth)acrylic resin (iii) | | | | | | | |
| (Meth)acrylic resin-1 | 2.5 | 5 | 10 | 5 | 5 | 5 | 5 |
| (Meth)acrylic resin-2 | | | | | | | |
| (Meth)acrylic resin-3 | | | | | | | |
| Properties of polyurethane hot melt | | | | | | | |
| NCO % | 2.2 | 2.0 | 1.8 | 2.2 | 2.4 | 2.4 | 2.4 |
| Melt viscosity (mPa · s, 125° C.) | 4,400 | 4,100 | 3,900 | 3,900 | 4,500 | 4,600 | 4,600 |
| Workability during application | B | A | A | A | A | A | A |
| Shape retention after application | A | A | A | A | A | A | A |
| Open time (min) | 7 | 8 | 6.5 | 9 | 6 | 7 | 6 |
| Flexibility evaluation | A | A | A | A | A | A | A |
| Mechanical properties | | | | | | | |
| Modulus at 100% (MPa) | 5.0 | 4.8 | 4.6 | 4.8 | 5.2 | 5.5 | 4.5 |
| Stress at break (MPa) | 28 | 27.1 | 25.9 | 29.3 | 30.1 | 31 | 25.4 |
| Elongation at break (%) | 1,156 | 1,251 | 1,249 | 1,090 | 980 | 985 | 1,195 |
| Adhesion strength to substrate (N/inch) | | | | | | | |
| ABS | 30 | 32 | 35 | 32 | 42 | 45 | 34 |
| PC | 30 | 32 | 35 | 32 | 43 | 45 | 33 |
| Acrylic | 30 | 32 | 35 | 33 | 40 | 40 | 38 |
| Fast-curing properties (creep resistance test) | | | | | | | |
| After 1 hour | N | N | N | N | N | N | N |
| After 2 hours | N | N | N | N | N | N | N |
| After 3 hours | Y | Y | Y | Y | Y | Y | Y |
| After 4 hours | Y | Y | Y | Y | Y | Y | Y |
| Water resistance | Y | Y | Y | Y | Y | Y | Y |
| Drop impact resistance | Y | Y | Y | Y | Y | Y | Y |

TABLE 4

|  | Example 15 | Example 16 | Example 17 | Example 18 | Example 19 |
|---|---|---|---|---|---|
| Polyol (A) | | | | | |
| Polyether polyol (A-1) | | | | | |
| PPG1000 | 15 | 15 | 15 | 15 | 15 |
| PPG2000 | 15 | 15 | 15 | 15 | 15 |
| PTMG1000 | | | | | |
| PTMG2000 | | | | | |
| Crystalline polyester polyol (A-2) | | | | | |
| Crystalline PEs-1 | | 10 | 10 | 10 | 10 |
| Crystalline PEs-2 | 20 | 10 | 10 | 10 | 10 |
| Amorphous polyester polyol (A-3) | | | | | |
| Amorphous PEs-1 | 7.5 | 15 | 15 | 15 | 15 |
| Amorphous PEs-2 | 7.5 | | | | |
| Acrylic polyol (A-4) | | | | | |
| Acrylic polyol-1 | 20 | 20 | 20 | 20 | 20 |
| Polyisocyanate (B) | | | | | |
| MDI | 16 | 16 | 16 | 16 | 16 |
| Curing catalyst (ii) | | | | | |
| Bis(2,6-dimethylmorpholinoethyl) ether | 0.1 | 0.1 | 0.5 | | 0.1 |
| Dimorpholinodiethyl ether | | | | 0.1 | |

TABLE 4-continued

|  | Example 15 | Example 16 | Example 17 | Example 18 | Example 19 |
|---|---|---|---|---|---|
| (Meth)acrylic resin (iii) |  |  |  |  |  |
| (Meth)acrylic resin-1 | 5 |  | 5 | 5 |  |
| (Meth)acrylic resin-2 |  | 5 |  |  |  |
| (Meth)acrylic resin-3 |  |  |  |  | 5 |
| Properties of polyurethane hot melt |  |  |  |  |  |
| NCO % | 2.3 | 2.0 | 2.0 | 2.0 | 2.0 |
| Melt viscosity (mPa · s, 125° C.) | 4,000 | 4,100 | 4,100 | 4,100 | 4,100 |
| Workability during application | A | A | A | A | A |
| Shape retention after application | A | A | A | A | A |
| Open time (min) | 8 | 8 | 8 | 8 | 8 |
| Flexibility evaluation | A | A | A | A | A |
| Mechanical properties |  |  |  |  |  |
| Modulus at 100% (MPa) | 4.2 | 4.6 | 4.5 | 4.5 | 4.4 |
| Stress at break (MPa) | 24 | 26.2 | 24.4 | 24.1 | 24.0 |
| Elongation at break (%) | 1,191 | 1,181 | 1,212 | 1,229 | 1,250 |
| Adhesion strength to substrate (N/inch) |  |  |  |  |  |
| ABS | 40 | 38 | 40 | 40 | 40 |
| PC | 41 | 40 | 41 | 38 | 38 |
| Acrylic | 44 | 41 | 40 | 41 | 41 |
| Fast-curing properties (creep resistance test) |  |  |  |  |  |
| After 1 hour | N | N | N | N | N |
| After 2 hours | N | N | Y | N | N |
| After 3 hours | Y | Y | Y | Y | Y |
| After 4 hours | Y | Y | Y | Y | Y |
| Water resistance | Y | Y | Y | Y | Y |
| Drop impact resistance | Y | Y | Y | Y | Y |

TABLE 5

|  | Comparative Example 7 | Comparative Example 8 | Comparative Example 9 | Comparative Example 10 | Comparative Example 11 | Comparative Example 12 |
|---|---|---|---|---|---|---|
| Polyol (A) |  |  |  |  |  |  |
| Polyether polyol (A-1) |  |  |  |  |  |  |
| PPG1000 |  | 15 | 15 | 15 | 15 | 15 |
| PPG2000 |  | 15 | 15 | 15 | 15 | 15 |
| Crystalline polyester polyol (A-2) |  |  |  |  |  |  |
| Crystalline PEs-1 |  |  |  |  |  |  |
| Crystalline PEs-2 | 30 |  | 25 | 30 | 20 | 20 |
| Amorphous polyester polyol (A-3) |  |  |  |  |  |  |
| Amorphous PEs-1 | 25 | 20 |  | 25 | 7.5 | 7.5 |
| Amorphous PEs-2 |  |  |  |  | 7.5 | 7.5 |
| Acrylic polyol (A-4) |  |  |  |  |  |  |
| Acrylic polyol-1 | 30 | 30 | 30 |  | 20 | 20 |
| Polyisocyanate (B) |  |  |  |  |  |  |
| MDI | 14 | 16 | 15.0 | 18 | 15.5 | 15.5 |
| Curing catalyst (ii) |  |  |  |  |  |  |
| Bis(2,6-dimethylmorpholinoethyl) ether | 0.1 | 0.1 | 0.1 | 0.1 |  |  |
| Dimorpholinodiethyl ether |  |  |  |  |  |  |
| Other catalysts |  |  |  |  |  |  |
| Dibutyltin dilaurate |  |  |  |  | 0.1 |  |
| Trioctylamine |  |  |  |  |  | 0.1 |
| (Meth)acrylic resin (iii) |  |  |  |  |  |  |
| (Meth)acrylic resin-1 | 10 | 5 | 5 | 5 | 5 | 5 |
| (Meth)acrylic resin-2 |  |  |  |  |  |  |
| Properties of polyurethane hot melt |  |  |  |  |  |  |
| NCO % | 2.6 | 2.5 | 2.3 | 2.2 | 2.4 | 2.4 |
| Melt viscosity (mPa · s, 125° C.) | 5,500 | 4,100 | 3,900 | 3,000 | 3,950 | 3,950 |
| Workability during application | B | A | A | A | — | — |
| Shape retention after application | A | B | A | A | — | — |

TABLE 5-continued

|  | Comparative Example 7 | Comparative Example 8 | Comparative Example 9 | Comparative Example 10 | Comparative Example 11 | Comparative Example 12 |
|---|---|---|---|---|---|---|
| Open time (min) | 6 | 15 | 5 | 3 | — | — |
| Flexibility evaluation | C | A | C | B | — | — |
| Mechanical properties |  |  |  |  |  |  |
| Modulus at 100% (MPa) | 12 | 4 | 11 | 7 | — | — |
| Stress at break (MPa) | 20 | 22 | 17 | 23 | — | — |
| Elongation at break (%) | 800 | 1230 | 800 | 850 | — | — |
| Adhesion strength to substrate (N/inch) |  |  |  |  |  |  |
| ABS | 18 | 18 | 7 | 11 | — | — |
| PC | 18 | 23 | 13 | 13 | — | — |
| Acrylic | 23 | 17 | 12 | 10 | — | — |
| Fast-curing properties (creep resistance test) |  |  |  |  |  |  |
| After 1 hour | N | N | N | N | — | — |
| After 2 hours | N | N | N | N | — | — |
| After 3 hours | Y | N | Y | Y | — | — |
| After 4 hours | Y | Y | Y | Y | — | — |
| Water resistance | N | N | N | N | — | — |
| Drop impact resistance | N | N | N | N | — | — |

The abbreviations in Tables 3 to 5 are described below:

"PTMG 1000": polytetramethylene glycol, number average molecular weight: 1,000

"PTMG 2000": polytetramethylene glycol, number average molecular weight: 2,000

"(Meth)acrylic resin-2": reaction product of butyl acrylate, butyl methacrylate, and 2-hydroxyethyl methacrylate in a ratio (by mass) of 74.65/25/0.35, glass transition temperature: −31° C.

"(Meth)acrylic resin-3": reaction product of butyl acrylate and butyl methacrylate in a ratio of 75/25, glass transition temperature: −31.6° C.

The resin compositions of Examples 1 to 7, which are moisture-curable polyurethane hot-melt resin compositions according to the present invention, were found to have superior water resistance, fast-curing properties, flexibility, adhesion to various substrates, workability during application, shape retention after application, and open time.

The resin compositions of Examples 8 to 12, which are moisture-curable polyurethane hot-melt resin compositions further containing an acrylic resin (iii), were found to also have superior drop impact resistance.

In contrast, the resin compositions of Comparative Examples 1 and 7, which contained no polyether polyol (A-1), were found to have inferior properties such as low water resistance and poor adhesion.

The resin compositions of Comparative Examples 2 and 8, which contained no crystalline polyester polyol (A-2), were found to have inferior properties such as low water resistance, inappropriate open time, and poor adhesion.

The resin compositions of Comparative Examples 3 and 9, which contained no amorphous polyester polyol (A-3), were found to have inferior properties such as low water resistance, low flexibility, and poor adhesion.

The resin compositions of Comparative Examples 4 and 10, which contained no acrylic polyol (A-4), were found to have inferior properties such as low water resistance, poor adhesion, and inappropriate open time.

The resin compositions of Comparative Examples 5 and 11, which contained a metal catalyst, i.e., dibutyltin dilaurate, as a curing catalyst, gelled.

The resin compositions of Comparative Examples 6 and 12, which contained a tertiary amine catalyst, i.e., trioctylamine, as a curing catalyst, foamed and gelled.

The invention claimed is:

1. A moisture-curable polyurethane hot-melt resin composition comprising:
    an isocyanate-containing urethane prepolymer (i) being a reaction product of polyols (A) including a polyether polyol (A-1), a crystalline polyester polyol (A-2), an amorphous polyester polyol (A-3), and an acrylic polyol (A-4) with a polyisocyanate (B); and
    a curing catalyst (ii) represented by general formula (1):

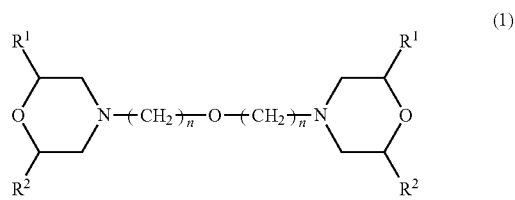

wherein:
    $R^1$ and $R^2$ are independently at each occurrence hydrogen or alkyl, and n is independently at each occurrence an integer of 1 to 6;
    the amorphous polyester polyol (A-3) is a reaction product of an alkylene oxide adduct of bisphenol A with a polybasic acid; and
    the amorphous polyester polyol (A-3) has a glass transition temperature of −70° C. to −10° C.

2. The moisture-curable polyurethane hot-melt resin composition according to claim 1, wherein the acrylic polyol (A-4) has a number average molecular weight of 5,000 to 50,000.

3. The moisture-curable polyurethane hot-melt resin composition according to claim 1, wherein the acrylic polyol (A-4) has a glass transition temperature of 30° C. to 120° C.

4. The moisture-curable polyurethane hot-melt resin composition according to claim 1, wherein the acrylic polyol (A-4) is used in an amount of 20 to 400 parts by mass based on 100 parts by mass of the polyether polyol (A-1).

5. The moisture-curable polyurethane hot-melt resin composition according to claim 1, wherein the curing catalyst (ii) is at least one selected from the group consisting of dimorpholinodiethyl ether and bis(2,6-dimethylmorpholinoethyl) ether.

6. The moisture-curable polyurethane hot-melt resin composition according to claim 1, wherein the curing catalyst (ii) is used in an amount of 0.05 to 5.0 parts by mass based on 100 parts by mass of the urethane prepolymer (i).

7. The moisture-curable polyurethane hot-melt resin composition according to claim 1, further comprising an acrylic resin (iii).

8. The moisture-curable polyurethane hot-melt resin composition according to claim 7, wherein the acrylic resin (iii) has a glass transition temperature of 0° C. or lower.

9. The moisture-curable polyurethane hot-melt resin composition according to claim 7, wherein the acrylic resin (iii) is used in an amount of 0.5 to 50 parts by mass based on 100 parts by mass of the polyols (A).

10. An adhesive prepared using the moisture-curable polyurethane hot-melt resin composition according to claim 1.

11. An article comprising at least two members laminated together with the adhesive according to claim 10.

* * * * *